United States Patent [19]

Ochiai

[11] Patent Number: 4,906,903
[45] Date of Patent: Mar. 6, 1990

[54] HORIZONTAL OUTPUT CIRCUIT FOR TELEVISION RECEIVER

[75] Inventor: Masashi Ochiai, Kumagaya, Japan

[73] Assignee: Kabushiki Kaisha Toshiba, Kawasaki, Japan

[21] Appl. No.: 217,864

[22] Filed: Jul. 12, 1988

[30] Foreign Application Priority Data

Jul. 13, 1987 [JP] Japan ................ 62-172841

[51] Int. Cl.$^4$ ..................... H01J 29/56; H01J 29/70
[52] U.S. Cl. ..................... 315/371; 315/408
[58] Field of Search .................. 315/370, 371, 408

[56] References Cited

U.S. PATENT DOCUMENTS 3,906,305  2/1975  Nielson .
4,254,365  5/1981  Knight .
4,482,846  11/1984  Worster .................. 315/371
4,733,141  3/1988  Watanuki ................ 315/408

FOREIGN PATENT DOCUMENTS

57-39102  1/1982  Japan .
60-44862  11/1985  Japan .

Primary Examiner—Thomas H. Tarcza
Assistant Examiner—Gregory C. Issing
Attorney, Agent, or Firm—Cushman, Darby & Cushman

[57] ABSTRACT

In the horizontal output circuit, a horizontal output transistor is coupled at the base with a drive pulse signal having negative peaks recurring at the horizontal periods of a television signal from a horizontal drive circuit. The emitter-collector path of the transistor is connected in parallel with a series circuit, a damper diode, and a resonant capacitor. The series circuit includes a horizontal deflecting coil and an S-distortion correcting capacitor. The collector of the transistor is connected through a flyback transformer to a DC power source. A parallel circuit is connected between the emitter of the transistor and a reference potential point. The parallel circuit is made up of a capacitor and a diode. The diodes are connected in a back-to-back manner. A series circuit including a choke coil and a capacitor is connected across the capacitor. A modulating source is connected across the capacitor of the smoothing circuit. The modulating source is controlled by a signal derived from a vertical output stage of the television receiver. The capacitor of the parallel circuit is discharged under control of the modulating source, so that the discharge current from the capacitor parabolically varies at the vertical scanning periods. The pincushion distortion is corrected through the parabolic variation of the horizontal deflecting current.

12 Claims, 5 Drawing Sheets

HORIZONTAL OUTPUT CIRCUIT FOR TELEVISION RECEIVER

BACKGROUND OF THE INVENTION

1. Field of the Invention

This invention relates to a horizontal output circuit in use with a television receiver, and more particularly, to the improvements of a horizontal output circuit for a television receiver, which has a correcting property of the called horizontal pincushion distortion, and is free from the raster distortion.

2. Description of the Related Art

When considering the deflection of cathode ray tubes (CRT) used for, for example, normal color television receivers and display monitors, the radius of curvature of the fluorescent screen of the CRT is not equal to the distance from the deflection center to the screen. The noncoincidence of these centers causes the raster on the screen to be distorted in a pincushion fashion. This type of raster distortion is usually corrected by increasing the horizontal amplitude toward the center of the vertical scanning. To be more specific, this correction is made by parabolically amplitude modulating an envelope of the horizontal deflecting current at the vertical periods.

The circuit arrangement of a horizontal output circuit with the pincushion correcting property will be described. A drive pulse signal varying at the horizontal periods is applied to the base of a horizontal output transistor. A damper diode and a resonant capacitor are coupled across the collector-emitter path of the transistor. A horizontal deflecting coil and a DC blocking capacitor called the S-distortion correcting capacitor are connected in parallel with a series circuit of the primary coil of a first transformer. The collector of the transistor is connected to a DC power source, through the primary coil of a second transformer. The first transformer is for correcting the horizontal pincushion distortion, with the drive coil to which a parabolic drive current at the vertical periods is fed. To form the drive current, the voltage in the vertical deflecting coil is integrated by an integrating circuit for wave shaping, and finally fed to the drive coil. The second transformer as a flyback transformer is connected in such a way that the secondary coil supplies a high voltage through a rectifier circuit to the anode of the CRT.

In the horizontal output circuit thus arranged, when the parabolic current at the vertical periods is fed to the primary coil of the drive coil, inductance of the primary coil connected in series to the horizontal deflecting coil varies in a parabolic fashion, thereby amplitude modulate the envelope of the horizontal deflection current at the vertical periods.

The horizontal output circuit using the correcting transformer, however, involves some problems to be solved. For a large correction, the inductance of the primary coil of the first transformer must be varied greatly. This results in increase of a ripple component contained in the high voltage, which comes through the high voltage rectifier in the secondary coil of the flyback transformer. This ripple causes the raster distortion. Further, the horizontal deflection current may saturate the correcting transformer. The saturation leads possibly to degradation of the horizontal linearity performance and nonuniformity of the correcting amount in the horizontal direction.

When a white signal as a video signal is received, the load current in the secondary coil of the flyback transformer (second transformer) increases, so that the increased amount of the current flows through the primary coil. This adversely effects the horizontal deflection current. The adverse effect appears in the reproduced picture such that when a cross pattern, for example, is received, the vertical bar following reproduction of the white horizontal bar is horizontally bent. A voltage drop resulting from the load current increase the called trapezoidal distortion. In the distortion, the bottom line extend outward, giving the shape of a trapezoid.

Figure 1:
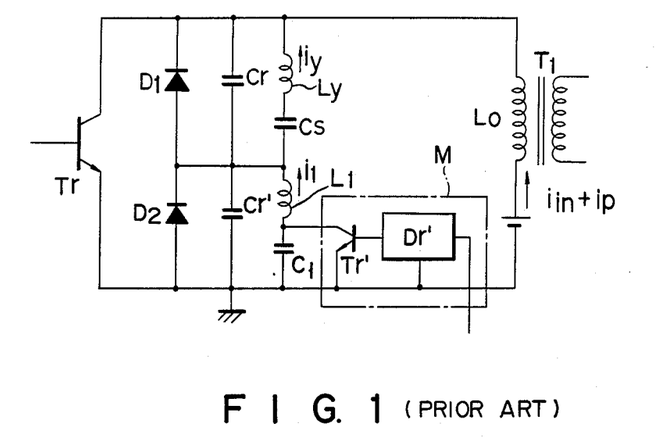
FIG. 1 is a circuit diagram of a conventional horizontal output circuit having no distortion correcting transformer.

Another horizontal output circuit with a correcting property of horizontal pincushion distortion is disclosed in U.S. Pat. No. 3,906,305 (Japanese Patent Publication (Kokoku) No. 39102/57). The arrangement of this circuit is shown in FIG. 1. In the figure, a pulse signal at the horizontal periods is applied to the base of horizontal output transistor Tr. The collector-emitter path of this transistor is coupled in parallel with a series circuit consisting of first and second damper diodes $D_1$ and $D_2$, which are connected with the polarity as shown, and another series circuit consisting of first and second resonant capacitors Cr and Cr'. Further, capacitor Cr is connected across a series circuit consisting of horizontal deflecting coil Ly and S-distortion correcting capacitor Cs. Capacitor Cr' is connected across a series circuit consisting of coil $L_1$ and capacitor $C_1$. Power source from DC power source E is supplied to the collector of transistor Tr via the primary coil Lo of transformer $T_1$. Modulating source M is connected across capacitor $C_1$. Modulating source M supplies a vertical pulse signal as received, to the base of transistor Tr', via drive stage Dr'. A control signal appearing across the collector-emitter path of transistor Tr' varies in a parabolic fashion. The control signal is applied across capacitor $C_1$, to control horizontal deflection current iy for correcting the horizontal pincushion distortion.

Figure 2A:
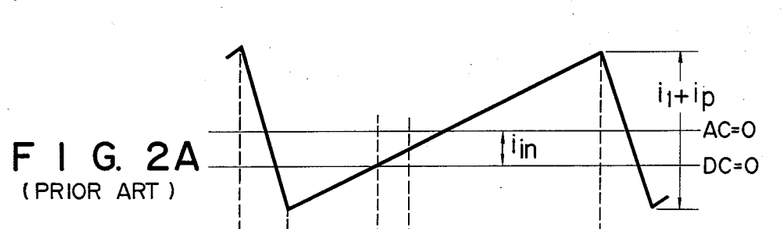
FIGS. 2A through 2C show a set of waveforms useful in explaining the operation of the FIG. 1 circuit.
Figure 2B:
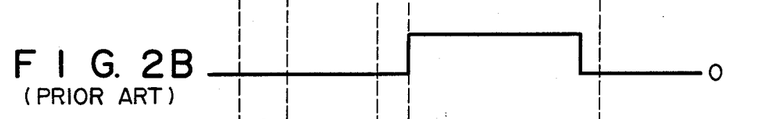
Figure 2C:
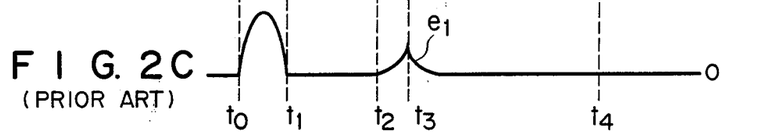

The operation of the horizontal output circuit thus arranged will be described referring to FIGS. 2A through 2C. At the start of the scanning period $t_1$ to $t_4$, damper diodes $D_1$ and $D_2$ are conductive, so that the circuit operation enters a damping phase or period ranging from $t_1$ to $t_2$. During the damping period, the voltages across first and second S-distortion correcting capacitors Cs and $C_1$ are respectively applied to coils Ly and $L_1$. These voltages cause saw-tooth wave currents to flow these coils, respectively. The current flowing through coil Ly is horizontal deflecting current $i_y$. Before the operation reaches the mid-point of the scanning period, a control signal (on-pulse) is supplied to the base of transistor Tr, and then transistor Tr is turned on. At the mid-point, the direction of the coil current is reversed. When current $i_y$ is larger than the current $i_l$ flowing through coil $L_1$, the current $i_y$ flows through transistor Tr. A difference of these currents $i_y$-$i_1$ flows through diode $D_2$. At this time, diode $D_1$ is not conductive. In the reverse case where current $i_1$ is larger than current $i_y$, a current amounting to current $i_l$ flows through transistor Tr. A difference between these current $i_l$-$i_y$ flows through diode $D_1$. Diode $D_2$ is not conductive. At the end of the scanning period, transistor Tr is turned off, and diodes $D_1$ and $D_2$ thus far conductive are not conductive. Operation enters a blanking phase or period ranging from $t_0$ to $t_1$. Therefore, the current flowing into transistor Tr flows into resonant capacitors Cr and Cr'. A voltage appears across the series circuit consisting of resonant capacitors Cr and Cr'. The waveform of this voltage resembles a sinusoidal waveform. As this voltage returns to zero, diodes $D_1$ and $D_2$ are both conductive, and the next scanning starts.

As already mentioned, the time period $t_0$ to $t_1$ is the blanking period. Time period $t_1$ to $t_2$ is the damping period. Time period $t_1$ to $t_4$ is the scanning period. Assuming that an AC current flowing through the primary coil of flyback transformer $T_1$ is $i_p$, a DC current flowing therethrough is $i_{in}$, an AC current flowing through coil $L_1$ is $i_1$, the sum of these currents $i_p + i_l + i_{in}$ is a saw-tooth wave current, as shown in FIG. 2A. When a rectangular wave video signal of white is supplied to the CRT display, a white peak current flows through the secondary coil of flyback transformer $T_1$, so that DC current flowing through the primary coil of transformer $T_1$ increases. At time point $t_2$ before time point $t_3$ that the on-pulse as shown in FIG. 2B is applied to the base of horizontal output transistor Tr, if the current $(i_p + i_l + i_{in})$ flowing into damper diode $D_2$ becomes zero, diode $D_2$ is turned off during the period $t_2$ to $t_3$ (discontinuous period). Discontinuous pulse $e_1$ as shown in FIG. 2C is observed in the voltage Vcr' across second resonance capacitor Cr'. The pulse $e_1$ pulls down the average value $\overline{V}cs$ of the voltage Vcs across S-distortion correcting capacitor Cs. This is because $\overline{V}cs + \overline{V}cr'183 = E$. Accordingly, when the white rectangular wave signal is supplied to the CRT display, and the signal level exceeds a predetermined value, the horizontal output circuit responds to this and voltage Vcs gradually drops. The gradual voltage drop gives an inversed trapezoidal distortion, or a keystone distortion, in which the bottom line compressed inward. The shape of the distorted figure is the inversion of that as caused by the horizontal output circuit using the correcting transformer.

The horizontal output circuit contains first and second circuitries. The first circuitry consists of horizontal deflecting coil Ly, first resonant capacitor Cr, first damper diode $D_1$, which are coupled in parallel. The second circuitry consists of coil $L_1$, second resonant capacitor Cr', and second damper diode $D_2$, which are also coupled in parallel. The scanning periods of the first and second circuitries must be terminated simultaneously. Therefore, the constants of these circuitries must be selected so as to satisfy $Ly \times Cr = L_1 \times Cr'$. Practically, however, it is very difficult to select those constants so as to satisfy the above relation and to secure the screen linearity correction (pincushion distortion correction).

As described above, in the conventional horizontal output circuit using the distortion correcting transformer, when a large correction is required, the raster distortion due to the high-voltage ripple occurs. Additionally, the correcting transformer may be saturated, so that the screen linearity is damaged. Further, when a white signal is received, the bending of the image or the trapezoidal distortion occur.

In the circuit that the first and second circuitries are connected to the horizontal output transistor, the modulating source M at the vertical periods is used in place of the correcting transformer, when it receives a white signal, a discontinuous phenomena occurs, so that the inversed trapezoidal distortion occurs or the circuit constant selection is difficult.

SUMMARY OF THE INVENTION

Accordingly, it is an object of the present invention to provide a horizontal output circuit with a pin-cushion distortion correcting property, which never causes any type of raster and image distortion.

According to this invention, there is provided a horizontal output circuit to be used with a television receiver, comprising a horizontal output transistor having a base, an emitter, and a collector, the base being coupled for reception with a drive pulse signal having negative peaks recurring at the horizontal scanning periods, and the collector being coupled through a first choke coil to a DC power source, a first series circuit coupled between the collector and the emitter of the horizontal output transistor, the first series circuit including a first coil and a first capacitor, a first parallel circuit coupled between the collector and the emitter of said horizontal output transistor, the first parallel circuit being a second series circuit including a first rectifying element and a second capacitor, a second parallel circuit coupled between the emitter of the horizontal output transistor and a reference potential point, the second parallel circuit including a second rectifying element and a third capacitor, and the second rectifying element being coupled back-to-back with the first rectifying element, smoothing circuit coupled across the third capacitor of the second parallel circuit, the smoothing circuit including a second choke coil and a fourth capacitor, and modulating means coupled in parallel with said fourth capacitor of said smoothing circuit.

BRIEF DESCRIPTION OF THE DRAWINGS

The manner in which the foregoing and other objects of the present invention are accompanying specification and claims considered together with the drawings, wherein:

DETAILED DESCRIPTION OF THE PREFERRED EMBODIMENTS

Some specific embodiments of the present invention will be described referring to the accompanying drawings.

Figure 3:
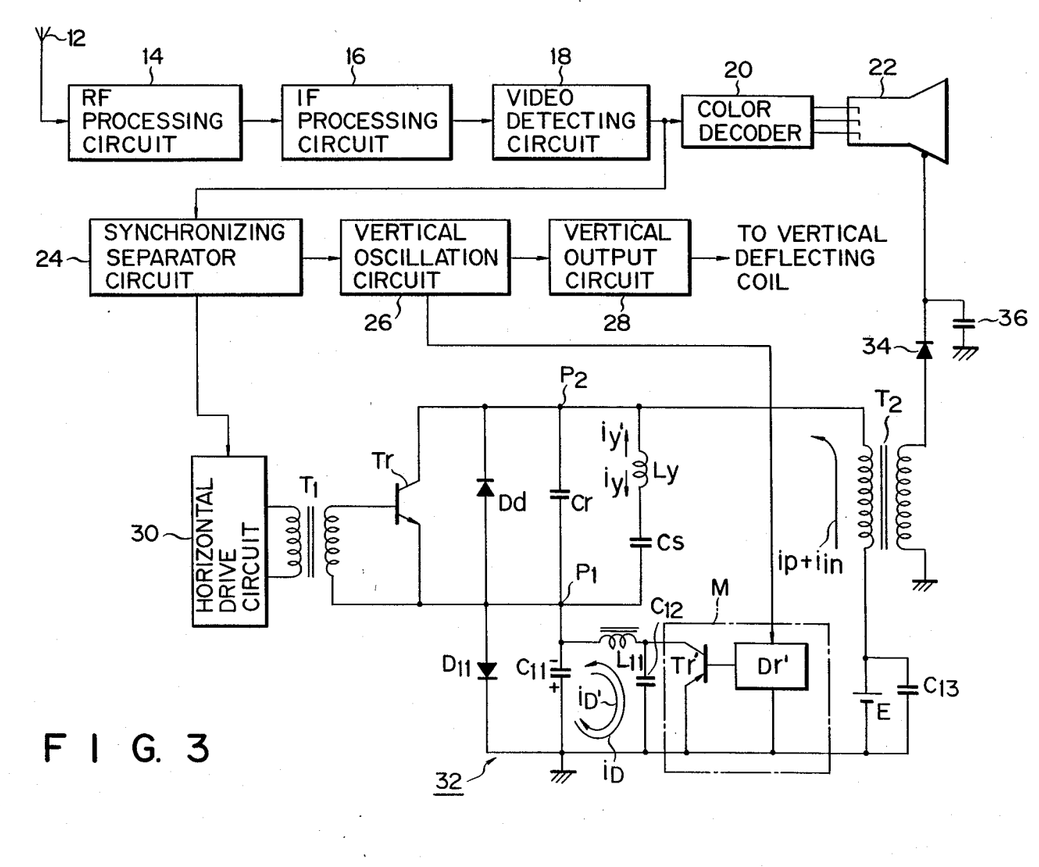
FIG. 3 shows a view for illustrating in block and schematic form a color television circuit incorporating a horizontal output circuit according to a first embodiment of this invention.

Reference is first made to FIG. 3 illustrating a configuration of a television receiver incorporating a horizontal output circuit according to a first embodiment of the present invention. A television signal is received by antenna 12, selected by high-frequency (RF) processing circuit 14 such as a tuner, and is amplified by intermediate frequency (IF) processing circuit 16. The amplified signal is applied through video detecting circuit 18 to color decoder 20 for reproducing color signals. The three reproduced primary color signals are supplied to color picture tube 22.

The output signal of video detecting circuit 18 is supplied to sync separator circuit 24. A vertical signal separated from the television signal by sync separator circuit 24 drives vertical oscillation circuit 26, which in turn oscillates to produce a signal. The output signal of vertical oscillation circuit 26 drives vertical output circuit 28. This circuit 28 supplies a vertical deflection current to a vertical deflecting coil (not shown). A horizontal synchronizing signal separated from the television signal by sync separator circuit 24 excites horizontal drive circuit 30 so that it outputs a signal. This output signal of horizontal drive circuit 30 is supplied to the primary coil of drive transformer $T_1$. The secondary coil of drive transformer $T_1$ is connected to horizontal output circuit 32.

An arrangement of this horizontal output circuit 32 will be described.

A drive pulse signal varying at the horizontal periods is derived from drive transformer $T_1$ and is applied to the base of horizontal output transistor Tr. The emitter-collector path (between nodes $P_1$ and $P_2$) of this transistor Tr is connected across damper diode Dd and resonant capacitor Cr. The emitter-collector path is further connected in parallel with a series circuit containing horizontal deflecting coil Ly and DC blocking capacitor Cs called the S-distortion correcting capacitor. The collector of transistor Tr is connected to DC power source E, via either the primary coil or the choke coil, of flyback transformer $T_2$. A parallel circuit containing diode $D_{11}$ and capacitor $C_{11}$ is connected between the emitter (node $P_1$) of transistor Tr and an earth point (reference potential point). Diodes $D_{11}$ and Dd are connected back-to-back, with the cathode of diode $D_{11}$ being connected to the earth point. Capacitor $C_{11}$ is connected across a series circuit containing smoothing coil $L_{11}$ and smoothing capacitor $C_{12}$. This capacitor $C_{12}$ is coupled in parallel with modulating source M. In modulating source M, a parabolic waveform signal supplied from the vertical output stage is applied through drive stage Dr' to the base of transistor Tr'. The collector of transistor Tr' is connected to the node between coil $L_{11}$ and capacitor $C_{12}$. The emitter of the transistor is connected to the earth point.

DC power source E is coupled in parallel with decoupling capacitor $C_{13}$ for supplying power thereto. The secondary coil of flyback transformer $T_2$ is coupled with the anode of color picture tube 22 via rectifying diode 34 and capacitor 36 which has a smoothing function.

The operation of the horizontal output circuit thus arranged and contained in the television receiver will be described.

At the beginning of the scanning period, damper diode Dd and diode $D_{11}$ are rendered conductive, to allow the voltage which has been charged in S-distortion correcting capacitor Cs by power source E, to go to horizontal deflecting coil Ly. During the damping period, horizontal deflection current $i_y$ and discharge current $i_D$ flow through a path containing coil Ly and damper diode Dd. In a time interval from the end of the damping period to the mid-point of the scanning period, an on-pulse is applied to the base of horizontal output transistor Tr, so that current $i_y$ may flows therethrough.

At the mid-point of the scanning period, electric energy is transferred to S-distortion correcting capacitor Cs and capacitor $C_{12}$, from power supply E. At the second half of the scanning period, capacitor Cs serves as a power source, so that the direction of current $i_y$ can be reversed. Reversed current $i_y'$ continues to flow until the scanning period has ended. When transistor Tr is turned off, the base drive of transistor Tr stops and the scanning period ends. At this time, the operation of horizontal output circuit 32 enters a parallel resonance mode. In this mode, the energy which has been stored in the coils Ly and $L_{11}$ and in the primary coil of flyback transformer $T_2$, is carried in the form of current $i_y$ into resonant capacitor Cr, and in the form of current $i_D'$ as the reversed current $i_D$ into capacitor $C_{11}$, for charging these capacitors. At the end of the charging operation for the capacitors, current $i_y$ begins to flow from capacitor Cr to coil Ly, thereby establishing the blanking period.

At the mid-point of the blanking period, the energy of the coil is completely transferred to the resonant capacitor, providing a maximum voltage. During the second half of the blanking period, the current flow direction is reversed, and the energy of the resonant capacitor is discharged through the coils. After the energy has been discharged through the coils, the current $i_y'$ as the reversed deflection current $i_y$ is maximized. At the end of the blanking period, damper diode Dd is rendered conductive and the next scanning period begins.

Figure 4:
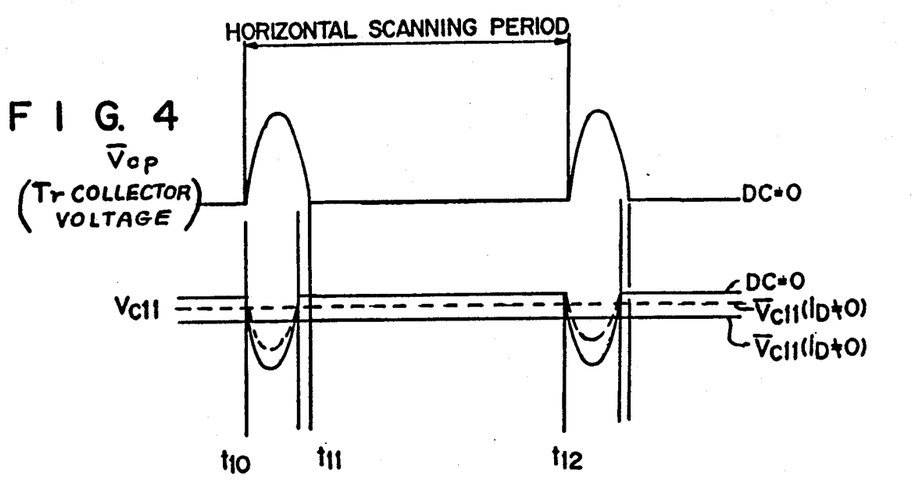
FIG. 4 shows a waveforms for explaining the operation of FIG. 3 circuit.

The sum of AC current $i_p$ and DC current $i_{in}$ flows through the parallel circuit made up of capacitor $C_{11}$ and diode $D_{11}$ in the horizontal output circuit. This sum current is fed from the primary coil of flyback transformer $T_2$ and power source E. A variation of the voltage $Vc_{11}$ across capacitor $C_{11}$ within the horizontal scanning period is shown in FIG. 4. During the positive period ($t_{11}$ to $t_{12}$), the sum current of $i_p$ and $i_{in}$ flows through diode $D_{11}$ to the earth point, while no current flows through capacitor $C_{11}$. During the negative period ($t_{10}$ to $t_{11}$), diode $D_{11}$ is turned off, and the voltage across capacitor $C_{11}$ is a negative voltage ($-Vc_{11}$). The sum of the average value $-\overline{V}cs$ of the voltage $-Vc_{11}$ and the average value $\overline{V}cs$ of the voltage Vcs across S-distortion correcting capacitor Cs is equal to power source voltage E; $\overline{V}cs+(-\overline{V}c_{11})=E$.

If a current path is formed of smoothing choke coil $L_{11}$ and capacitor $C_{12}$, and modulating source M discharges current $i_D$, the voltage across capacitor $C_{11}$ causes the discharge $i_D$ to flow through the current path. As a result, the voltage $-Vc_{11}$, having a voltage potential before the discharge indicated by a solid line in FIG. 4, drops to a voltage potential indicated by a broken line in FIG. 4. As a result, the level of average voltage $-\overline{V}c_{11}$ decreases, with its voltage level approaching from a straight solid line to a straight broken line. The level of voltage $\overline{V}cs$ across the S-distortion correcting capacitor decreases as given by $Vcs=E-(-\overline{V}c_{11})$. In turn, the amount of horizontal deflection current $i_y$ also decreases. When the amount of discharge current $i_D$ is reduced, the level of voltage $-Vc_{11}$ becomes large and then voltage $\overline{V}cs$ become large, thereby causing the amount of horizontal deflection current $i_y$ to increase.

Figure 5A:
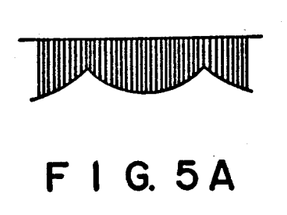
FIGS. 5A and 5B show a waveform of the voltage at node $P_1$ and a waveform across an S-distortion correcting capacitor, respectively.

At the end of the scanning period, the energy stored in coil Ly is transferred to resonant capacitor Cr. a positive horizontal pulse ($V_{CP}$) appears at capacitor Cr, i.e., node P2, as is shown in FIG. 4. The pulse voltage shown in FIG. 5A appears at node $P_1$, which is placed at the voltage across capacitor $C_{11}$. Since the pulse voltage, which has a fixed duration of the peak appearing across capacitor Cr, is applied to the primary coil of flyback transformer $T_2$, a high voltage across the secondary coil of flyback transformer $T_2$ can be kept constant.

Figure 5B:
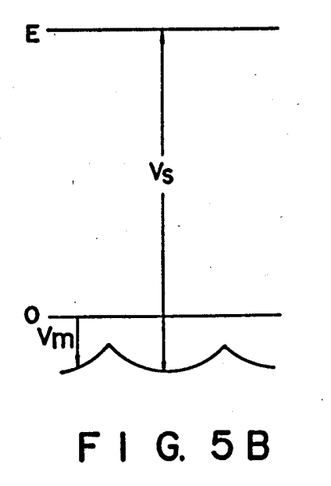
Figure 6:
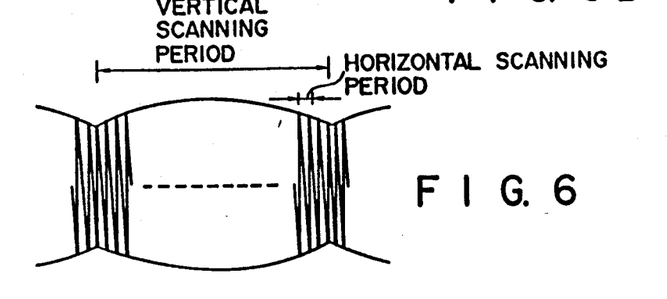
FIG. 6 shows a waveform of a parabolically modulated horizontal deflecting current.

When a negative pulse appearing at node $P_1$ is integrated by a combination of coil $L_{11}$ and capacitor $C_{12}$, the average value as a negative voltage appears across capacitor $C_{12}$. This voltage is modulated by modulating source M into a parabolic wave signal. This parabolic wave signal is a negative voltage, as indicated by Vm in FIG. 5B. The sum of power source voltage E and that voltage Vm appears across S-distortion correcting capacitor Cs. This voltage Vs supplies power to deflecting coil Ly, so that a signal of a parabolic modulated waveform as shown in FIG. 6 appears across the horizontal deflecting coil. As a result, the pincushion distortion is corrected.

As seen from the foregoing, the amount of the discharge current $I_D$ across capacitor $C_{11}$ is varied by modulating source M, so as to vary the amount of horizontal deflecting current $i_y$ at the vertical scanning periods in a parabolic fashion, thereby correcting the pincushion distortion.

Since the horizontal output circuit according to this invention does not use the distortion correcting transformer, unlike in the prior art circuit, it is free from high voltage ripple problems and raster distortion problems caused by saturation of the transformer. Further, it never suffers from the inversed trapezoidal distortion due to the discontinuous phenomenon, which is essential to the circuit of FIG. 1. The reason for this follows. As the result of increasing the secondary side load of flyback transformer $T_2$, the amount of current $i_{in}$ flowing into the primary coil increases. In turn, the voltage $-V_{C11}$ across capacitor $C_{11}$ increases proportional to the current $i_{in}$. In this case, a variation of the average voltage $-\bar{V}_{C11}$ bar acts so as to cancel the raster distortion. When the rectangular wave signal of white is received, the high voltage drops to cause a pincushion distortion on the CRT screen. At this time, the voltage $-V_{C11}$ across capacitor $C_{11}$ becomes small, and the voltage Vcs across the S-distortion correcting capacitor Cs drops. Then, the horizontal deflecting current iy decreases, and the trapezoidal distortion is also reduced.

According to the invention diode $D_{11}$ is connected between transistor Tr and the earth point, with its anode coupled to the emitter of transistor Tr and its cathode coupled to the earth point. Therefore, diode $D_{11}$ is turned on regardless of the timing of supplying the on-pulse (FIG. 2B) to the base of transistor Tr, even if a white video signal of a square waveform is supplied to transistor Tr, thus increasing the DC current $i_{in}$ flowing through the primary winding of flyback transformer $T_2$. The white video signal will have no distorted waveform (i.e., an inverted trapezoid) when it is at a level higher than a predetermined value.

Another prior art circuit having no correcting transformer, which is shown in FIG. 1, is so designed that coil $L_1$ and second resonant circuit Cr' in the second circuitry form a parallel resonant circuit, and to resemble this resonance to that of the second circuitry, the constants of these circuitries must be selected to be $Ly \times Cr = L_1 \times Cr'$. In connection with this, in the FIG. 3 circuit, coil $L_{11}$ is used merely for a smoothing capacitor. Therefore, selection of the constant of the inductive element is easy.

In the FIG. 1 circuit, when a brightness on the CRT varies, the high voltage current varies and the high voltage also changes. Therefore, the horizontal voltage amplitude varies. On the other hand, in the horizontal output circuit according to this invention, the variation problem arising from the same cause can be almost solved. The reason for this will be described.

At the end of the scanning period, the energy stored in deflecting coil Ly is transferred to the resonant capacitor in the form of current $i_y$. The energy stored in the primary coil of flyback transformer $T_2$ is transferred to the resonant capacitor in the form of the sum current $i_p + i_{in}$.

When the CRT screen becomes dark and the high-voltage current in the secondary coil of flyback transformer $T_2$ decreases, the sum current $i_p + i_{in}$ in the primary coil also decreases, so that the current flowing through capacitor $C_{11}$ increases. Therefore, a pulse appearing at node $P_1$ becomes large, and with increase of the pulse the voltage Vm across capacitor $C_{12}$ also becomes large. Thus, when the CRT screen is dark, the voltage across S-distortion correcting capacitor Cs increases, the high voltage rises, and the horizontal voltage amplitude will decrease. At this time, however, the deflecting coil current increases, to increase the horizontal voltage amplitude. In this way, even if the brightness on the screen varies, the horizontal voltage amplitude is kept almost constant.

Figure 7:
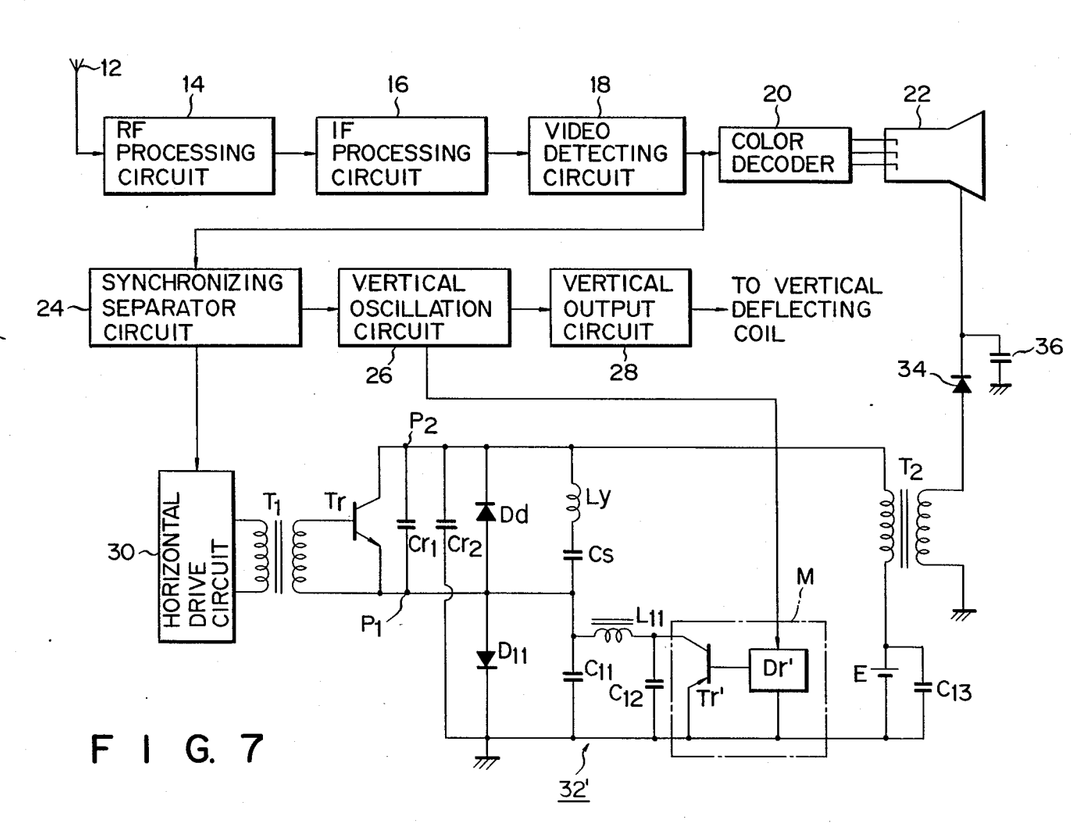
FIGS. 7 and 8 respectively show views for illustrating in block and schematic form color television circuits incorporating horizontal output circuits according to second and third embodiments of this invention.
Figure 8:
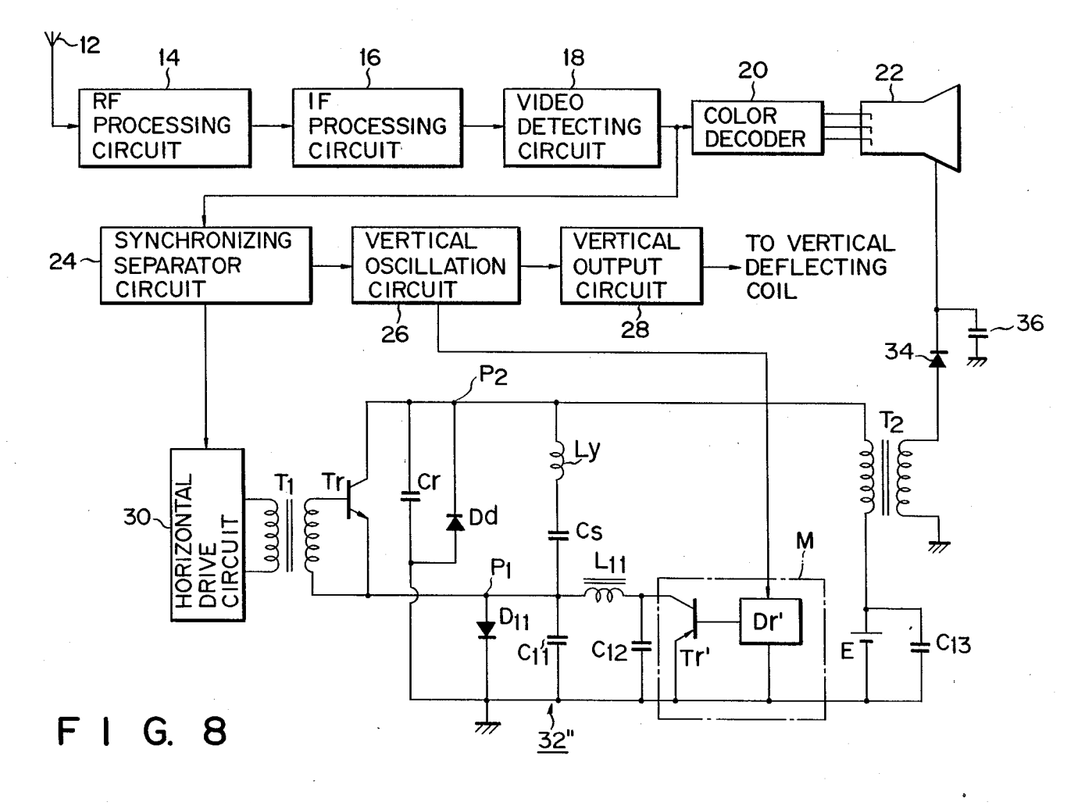

The second and third embodiments of this invention will be described, placing emphasis on the circuit arrangements thereof. The operation of each of these embodiments is similar to that of the first embodiment as mentioned above, and hence the description of it will be omitted.

As shown in FIG. 7, in horizontal output circuit 32', the primary coil of drive transformer $T_1$ is connected to horizontal drive circuit 30. A drive pulse signal at the horizontal scanning periods is derived from drive transformer $T_1$, and applied to the base of horizontal output transistor Tr. The collector-emitter path of transistor Tr (the path between nodes $P_1$ and $P_2$) is connected in parallel with a series circuit including resonant capacitor $Cr_1$, damper diode Dd connected with the polarity as shown, horizontal deflecting coil Ly, and S-distortion correcting capacitor Cs. The collector of transistor Tr is connected to a parallel circuit made up of DC power source E and decoupling capacitor $C_{13}$, through the primary coil (or choke coil) of flyback transformer $T_2$. A parallel circuit including diode $D_{11}$ and capacitor $C_{11}$ is connected between the emitter of transistor Tr (node $P_1$) and the earth point (reference potential point). Diode $D_{11}$ is connected at the cathode to the earth point, and therefore is connected to the damper diode Dd in a back-to-back fashion. A second resonant capacitor $Cr_2$ is connected between the collector (node $P_2$) of transistor Tr and the earth point. A series circuit including smoothing coil $L_{11}$ and smoothing capacitor $C_{12}$ is connected across capacitor $C_{11}$. Modulating source M is connected across smoothing capacitor $C_{12}$. Modulating source M receives a parabolic wave signal from the vertical output stage, and supplies it to the base of transistor Tr' via drive stage Dr'. The collector of transistor Tr' is connected to the node of coil $L_{11}$ and capacitor $C_{12}$. The emitter of the transistor is connected to the earth point. The secondary coil of flyback transformer $T_2$ is connected to the anode of color picture tube 22. This connection is the same as in the first embodiment.

Turning now to FIG. 8, there is shown a third embodiment of this invention. As shown, in horizontal output circuit 32", the primary coil of drive transformer $T_1$ is connected to horizontal drive circuit 30. This is like those of the first and second embodiments. The drive pulse signal at the horizontal periods is derived from drive transformer $T_1$, and is applied to the base of horizontal output transistor Tr. The collector of transistor Tr is connected to capacitor Cr and diode Dd. The diode Dd is connected with the polarity as shown. The emitter-collector path of transistor Tr (between nodes $P_1$ and $P_2$) is connected in parallel with a series circuit made up of horizontal deflecting coil Ly and S-distortion correcting capacitor Cs. The collector of transistor Tr is connected to a parallel circuit made up of DC power source E and decoupling capacitor $C_{13}$ for power source, through the primary coil (or choke coil) of flyback transformer $T_2$. A parallel circuit including diode $D_{11}$ and capacitor $C_{11}$ is connected between the emitter of transistor Tr (node $P_1$) and the earth point. Diode $D_{11}$ is connected at the cathode to the earth point, and is connected to the damper diode Dd in a back-to-back fashion. A second resonant capacitor $Cr_2$ is connected between the collector (node $P_2$) of transistor Tr and the earth point. A series circuit including smoothing coil $L_{11}$ and smoothing capacitor $C_{12}$ is connected across capacitor $C_{11}$. Modulating source M is connected across smoothing capacitor $C_{12}$. Modulating source M receives a parabolic wave signal from the vertical output stage, and supplies it to the base of transistor Tr' via drive stage Dr'. The collector of transistor Tr' is connected to the node of coil $L_{11}$ and capacitor $C_{12}$. The emitter of the transistor is connected to the earth point. The secondary coil of flyback transformer $T_2$ is connected to the anode of color picture tube 22. This connection is the same as in the first and second embodiments.

As seen from the foregoing, in the horizontal output circuit according to this invention, the modulated voltage of the parabolic wave varies in the negative domain. Therefore, the circuit is able to correct the pincushion distortion, and is free from any type of picture distortion.

What is claimed is:

1. A horizontal output circuit to be used with a television receiver, comprising:
    a horizontal output transistor having a base, an emitter, and a collector, the base being coupled for reception of a drive pulse signal having negative peaks recurring at the horizontal scanning periods, and the collector being coupled through a first choke coil to a first end of a DC power source, the DC power source having a second end connected to a reference potential point;
    a first series circuit coupled between the collector and the emitter of said horizontal output transistor, said first series circuit including a first coil and a first capacitor;
    a first parallel circuit coupled between the collector and the emitter of said horizontal output transistor, said first parallel circuit including a first rectifying element and a second capacitor;
    a second parallel circuit coupled between the emitter of said horizontal output transistor and the reference potential point, said second parallel circuit consisting of a second rectifying element and a third capacitor, said second rectifying element being coupled back-to-back with said first rectifying element;
    smoothing circuit coupled across said third capacitor of said parallel circuit, said smoothing circuit including a second choke coil and a fourth capacitor; and
    modulating means coupled in parallel with said fourth capacitor of said smoothing circuit.

2. A circuit according to claim 1, wherein said first choke coil is a horizontal deflection coil, and said first capacitor is an S-distortion correcting capacitor.

3. A circuit according claim 1, wherein said first rectifying element is a damper diode connected at the anode to the emitter of said horizontal output transistor and at the cathode to the collector of said horizontal output transistor, and said second rectifying element is a diode connected at the anode to the emitter of said horizontal output transistor and at the cathode to the reference potential point.

4. A circuit according to claim 1, wherein said second capacitor is a resonant capacitor.

5. A circuit according to claim 1, wherein said modulating means includes drive means for supplying a signal output from vertical output means to said fourth capacitor, and a second transistor having a base, a collector, and an emitter, the base being connected to said drive means, the emitter being connected to the reference potential point, and the collector being connected between said second choke coil and said fourth capacitor.

6. A circuit according to claim 1, further comprising a fifth capacitor coupled between the collector of said horizontal output transistor and the reference potential point.

7. A circuit according to claim 1, wherein said fifth capacitor is a resonant capacitor.

8. A horizontal output circuit to be used with a television receiver, comprising:
    a horizontal output transistor having a base, an emitter, and a collector, the base being coupled for reception of a drive pulse signal having negative peaks recurring at the horizontal scanning periods, and the collector being coupled through a first choke coil to a first end of a DC power source, the DC power source having a second end connected to a reference potential point;
    a series circuit coupled between the collector and the emitter of said horizontal output transistor, said series circuit including a first coil and a first capacitor;
    a first parallel circuit coupled between the collector of said horizontal output transistor and the reference potential point, said first parallel circuit consisting of a first rectifying element and a second capacitor;
    a second parallel circuit coupled between the emitter of said horizontal output transistor and the reference potential point, said second parallel circuit including a second rectifying element and a third capacitor, said second rectifying element being coupled back-to-back with said first rectifying element;
    a smoothing circuit coupled across said third capacitor of said second parallel circuit, said smoothing circuit including a second choke coil and a fourth capacitor; and
    modulating means coupled in parallel with said fourth capacitor of said smoothing circuit.

9. A circuit according to claim 8, wherein said first choke coil is a horizontal deflection coil, and said first capacitor is an S-distortion correcting capacitor.

10. A circuit according claim 8, wherein said first rectifying element is a damper diode connected at the anode the reference potential point and at the cathode to the collector of said horizontal output transistor, and said second rectifying element is a diode connected at the anode to the emitter of said horizontal output transistor and at the cathode to the reference potential point.

11. A circuit according to claim 8, wherein said second capacitor is a resonant capacitor.

12. A circuit according to claim 8, wherein said modulating means includes drive means for supplying a signal output from said vertical output means to said fourth capacitor, and a second transistor having a base, collector, and emitter, the base being connected to said drive means, the emitter being connected to the reference potential point, and the collector being connected between said second choke coil and said fourth capacitor.

* * * * *